US007117262B2

(12) United States Patent
Bai et al.

(10) Patent No.: US 7,117,262 B2
(45) Date of Patent: Oct. 3, 2006

(54) COOPERATIVE MANAGEMENT OF DISTRIBUTED NETWORK CACHES

(75) Inventors: Joseph J. Bai, Tewksbury, MA (US); Robert Carney, Cambridge, MA (US); Paul Cheng, Cambridge, MA (US); Jonathan C. Crane, Hanover, NH (US)

(73) Assignee: Inktomi Corporation, Foster City, CA (US)

( * ) Notice: Subject to any disclaimer, the term of this patent is extended or adjusted under 35 U.S.C. 154(b) by 604 days.

(21) Appl. No.: 10/017,997

(22) Filed: Oct. 30, 2001

(65) Prior Publication Data

US 2002/0107944 A1 Aug. 8, 2002

Related U.S. Application Data

(60) Provisional application No. 60/245,007, filed on Nov. 1, 2000.

(51) Int. Cl.
*G06F 15/177* (2006.01)
*G06F 15/16* (2006.01)

(52) U.S. Cl. .................... 709/224; 709/223
(58) Field of Classification Search ............... 709/223, 709/224, 203, 225; 705/14, 40
See application file for complete search history.

(56) References Cited

U.S. PATENT DOCUMENTS

| 5,611,049 | A | | 3/1997 | Pitts ..................... 395/200.09 |
|---|---|---|---|---|
| 5,913,041 | A | * | 6/1999 | Ramanathan et al. ....... 709/233 |
| 6,012,038 | A | * | 1/2000 | Powell ...................... 709/219 |
| 6,014,698 | A | | 1/2000 | Griffiths |
| 6,018,619 | A | * | 1/2000 | Allard et al. ............... 709/224 |
| 6,035,281 | A | * | 3/2000 | Crosskey et al. ............. 705/14 |
| 6,085,234 | A | | 7/2000 | Pitts et al. ................. 709/217 |
| 6,119,150 | A | | 9/2000 | Fujii et al. .................. 709/213 |
| 6,237,060 | B1 | | 5/2001 | Shilts et al. ................ 711/100 |

(Continued)

OTHER PUBLICATIONS

Canadian Intellectual Property Office, Office Action, Dated Mar. 8, 2005 for Application 2,434,330, request to amend the application, 2 pgs.

(Continued)

*Primary Examiner*—Saleh Najjar
*Assistant Examiner*—Benjamin R. Bruckart
(74) *Attorney, Agent, or Firm*—Hickman Palermo Truong & Becker LLP

(57) ABSTRACT

The techniques described employ a cooperative organization of network service providers to provide improved distributed network services. The network service providers that are constituent to the cooperative organization represent various perspectives within the overall Internet content distribution network, and may include network owners, telecommunications carriers, network access providers, hosting providers and distribution network owners, the latter being an entity that caches content at a plurality of locations distributed on the network. Aspects include managing content caches by receiving control signals specifying actions related to cached content that is distributed on a network, such as the Internet, and forwarding the control signals through to the caching locations to implement the actions represented by the control signals, thus providing content publishers the capability of refreshing their content regardless of where it is cached. Aspects include managing content caches by receiving activity records that contain statistics related to requests for cached content, segregating the statistics according to which content publisher provides the content associated with the statistics, and providing to each content publisher statistics corresponding to content provided by that content publisher, thus allowing them to monitor requests for their content regardless of where it may be cached on the network.

16 Claims, 6 Drawing Sheets

U.S. PATENT DOCUMENTS 6,434,609 B1 * 8/2002 Humphrey ................. 709/218
6,516,416 B1 * 2/2003 Gregg et al. ............... 709/225
6,714,978 B1 * 3/2004 Porter ....................... 709/224
6,760,763 B1 * 7/2004 Jennings et al. ........... 709/224

OTHER PUBLICATIONS

Current Claims, Canadian Patent Application 2,424,330, Aggregated Management fo Distributed Network Caches, pp. 1-12.

* cited by examiner

COOPERATIVE MANAGEMENT OF DISTRIBUTED NETWORK CACHES

CROSS REFERENCE TO RELATED APPLICATIONS

This patent application claims priority from U.S. Provisional Patent Application No. 60/245,007, entitled "Methods for Aggregated Management of Distributed Network Caches", filed by Joseph J. Bai, Robert Carney, Paul Cheng, and Jonathan C. Crane on Nov. 1, 2000, the contents of which are herein incorporated by reference in its entirety.

FIELD OF THE INVENTION

The present invention relates generally to communication over a network; more specifically, to techniques for managing content caches and related services across multiple networks.

BACKGROUND OF THE INVENTION

The combination of communication networks which has become commonly known as the Internet initially transported client (sometimes herein referred to as an audience) requests from an desktop personal computer or workstation to a content origin server relatively unaltered. A content publisher, which received all of the client requests for their content and transmitted responses thereto, typically paid for these network transactions by settling with an entity (sometimes herein referred to as a hosting provider) that provided the content publisher with access, and the necessary transmission bandwidth, to the Internet through the destination server. The audience typically settled with a network access provider, such as an ISP, that provided access to the Internet through the originating server. This settlement was typically based on network connection time and bandwidth. This scheme was relatively stable and successful. Indeed, content publishers were keenly aware of their audience's activities and the audience was assured current content by interfacing directly with the content publishers' servers.

Evolution of the Internet has changed this client-server interaction scheme. Specifically, the development and deployment of network content caching technologies has modified the pattern of interaction between content publishers and their respective audiences. Today, proxy caches located on access provider networks often intercept audience requests immediately upon entering the access provider's network. Caches, which reduce the bandwidth costs to the access provider, store content previously requested by an audience member. Thus, the content can be recalled by additional audience members without having to return to the content publisher's origin server, to access the requested content.

Caching schemes have disrupted the network traffic awareness of content publishers and the economic simplicity of the Internet. Content publishers often no longer receive requests from or directly respond to all of their audience members, thus losing some visibility of their operations. Furthermore, hosting providers lose revenue tied to audience traffic metrics related to the content that is requested from their hosting services. In addition, access providers are also affected by such a caching scheme, because they are essentially acting on behalf of the content publishers by providing caching infrastructure and services, but receiving no related compensation from the content publishers. Finally, audience members are offered improved performance from the caching scheme offered by access providers and others, without being required to compensate the providers for the improved performance.

Several content caching schemes are currently implemented on the Internet, which affect the services and associated revenue models of various types of network service providers. For example, access providers may force an audience request to a proxy server, where a large number of requests terminate and from which cached content is served, thus reducing required network bandwidth. Consequently, revenue from access providers to telecommunications carriers that provide the network backbone infrastructure is reduced. Furthermore, telecommunications carriers may aggregate requests from multiple access providers prior to forwarding to content servers, which reduces the apparent requests for content from the content publishers as evidenced at the associated hosting providers. Consequently, hosting providers contribute less revenue to the telecommunications carriers, and, since the number of requests reaching the hosting providers is reduced, the content publishers contribute less revenue to the hosting providers. Hence, the introduction of these types of services has disrupted the previously typical, and relatively simple, flow of revenue between Internet participants.

For another example, a content caching scheme involves content publishers proactively transmitting content to a content distribution network through a hosting provider, whereby the distribution network stores copies of the content at various network nodes where it is accessible to audience members at will. The hosting provider loses revenue due to the reduced bandwidth related to content requests that it provides to the content publisher, but also receives additional revenue for its contribution to the content distribution service. In addition, the distribution network receives compensation from the content publisher for the distribution services provided, whereas telecommunications carriers typically receive less revenue due to reduced traffic on their network lines. Hence, the introduction of these types of services has also disrupted the previously typical flow of revenue between Internet participants.

Based on the foregoing shortcomings, a previously unmet need is recognized for a network services model that compensates various network providers for the contribution that they make to the efficient distribution of content between content publishers and audience members.

SUMMARY OF THE INVENTION

Aspects of the invention relate to cooperative management of content cached throughout the Internet at distributed locations. In general, the techniques described employ a cooperative organization of network service providers to provide improved distributed network services. The network service providers that are constituent to the cooperative organization represent various standpoints of the overall Internet content distribution network. For example, in one embodiment, the cooperative includes but is not limited to network owners, telecommunications carriers, network access providers, hosting providers, and distribution network owners, the latter being an entity that caches content at a plurality of locations distributed on the network. Those that benefit from the cooperative and their associated services include at least content publishers, access providers, content hosting providers, and the audience who view content.

In one aspect, a method for managing content caches comprises receiving and validating control signals that specify an action related to cached content that is distributed on a network, such as the Internet, and forwarding the control signals to control gateways within content distribution networks which cache content at a plurality of locations. The distribution networks in turn forward the control signals on to the caching locations to implement the actions represented by the control signals. In one embodiment, the control signals are received from content hosting providers that received them from associated content publishers, which allows the publishers to modify their distributed cached content with a single interaction with a cooperative gateway server. In another embodiment, the control signals are also forwarded to network access providers for passing on to edge servers that serve requested content.

In another aspect, a method for managing content caches comprises receiving and storing activity records related to requests for cached content that is distributed on a network, such as the Internet, and forwarding activity logs comprising activity records related to specific content publishers to a gateway for retrieval by the respective content publishers. In one embodiment, the activity records are received from distribution network servers that received them from network access providers. In another embodiment, the access providers receive the activity records from edge servers. Embodiments allow content publishers to monitor requests for their content regardless of where it may be distributively cached on the network.

Further embodiments, regarding both the control signal and activity record aspects, comprise receiving revenue for the network services provided by the cooperative members, and distributing the revenue based on member contribution to the services rendered. In addition, one embodiment distributes the revenue with further consideration to the quality of the services provided by the cooperative members.

Implementations of the invention are embodied in methods, apparatus, and computer-readable media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for cooperative management of distributed network caches is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Embodiments of the invention facilitate cooperation among various Internet service providers to provide improved distributed network services. The network service providers that are constituent to a cooperative organization (hereinafter "cooperative") represent various standpoints, or perspectives, within the overall Internet content distribution network. For example, in one embodiment, the cooperative includes but is not limited to network owners, telecommunications carriers, network access providers, content hosting providers and distribution network owners, the latter being an entity that caches content at multiple locations distributed on the network. Those that benefit from the cooperative and their associated services include at least content publishers, access providers/networks, content hosting providers, and the audience who view content. Furthermore, mechanisms are provided for compensating cooperative members for their contributions to delivering the content from content publishers to audience members.

Figure 1:
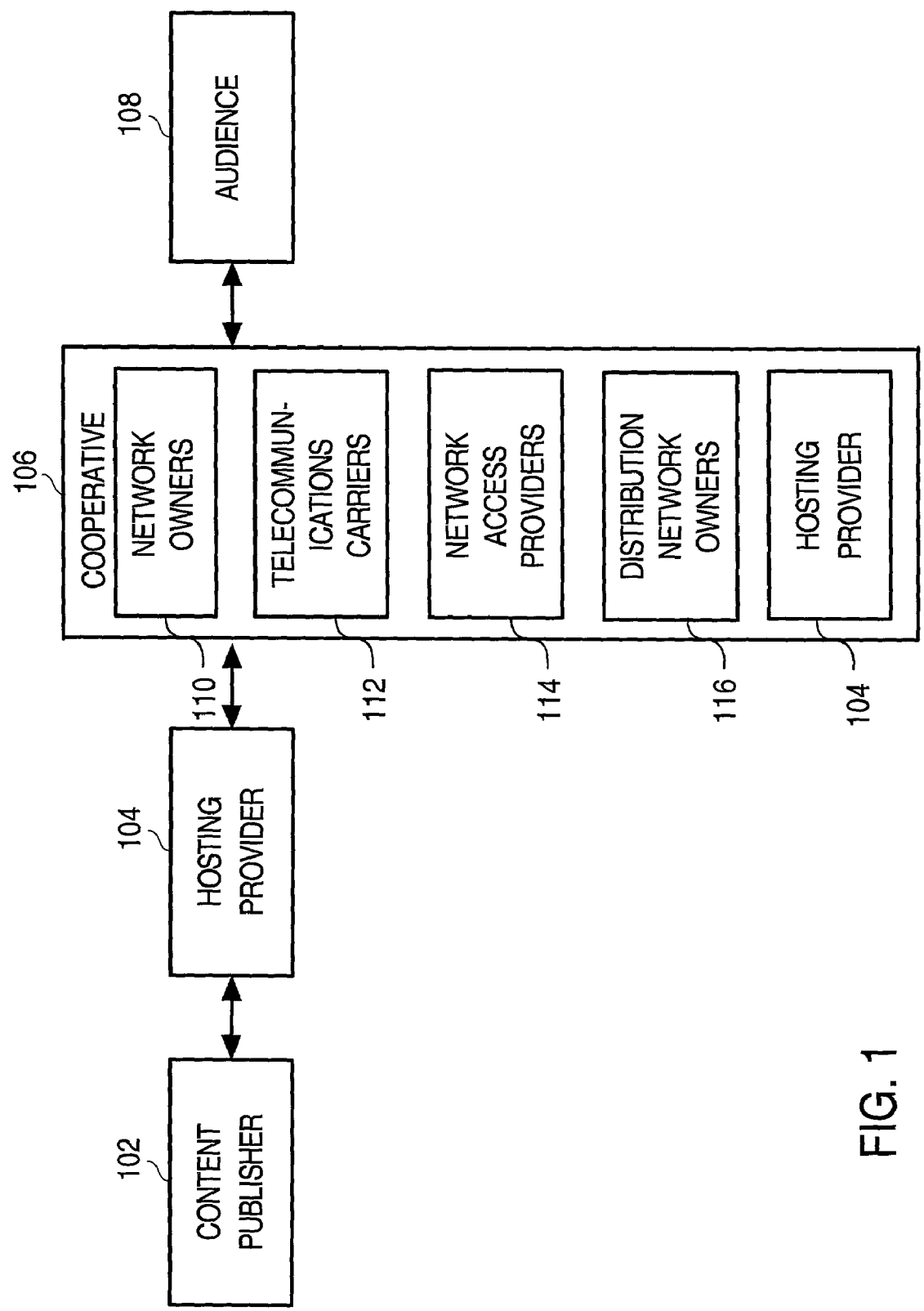
FIG. 1 is a block diagram generally illustrating entities involved in the supply and demand chain for Internet content, according to an aspect of the invention.

FIG. 1 is a block diagram generally illustrating entities involved in the supply and demand chain for Internet content, according to an aspect of the invention. A content publisher 102 is any entity that publishes content, for example, web pages, music, video, electronic books, and other material distributable over a network, that is accessible over the Internet. A hosting provider 104 is any entity that hosts content, such as a website, for a content publisher. A hosting provider 104 provides network resources, for example, storage, access, and bandwidth, to a content publisher in order to facilitate the first portion of the content distribution process.

A cooperative 106 comprises various Internet service providers cooperating to provide improved distributed network services, and whose members represent various standpoints within the overall Internet content distribution network. As described above, in one embodiment the cooperative includes but is not limited to network owners 110, telecommunications carriers 112, network access providers 114, and distribution network owners 116. A network owner 110 is, generally, any entity that owns or controls a portion of the Internet infrastructure. A telecommunications carrier 112 is an entity that owns the domestic and international backbone wires and cable over which Internet data is transmitted, linking many networks together. A network access provider 114 is an entity that provides at least Internet access to an audience 108 of subscribers, which typically comprises the general public and business organizations. Access providers 114, for example, Internet Service Providers (ISP), often provide services other than simply Internet access. For example, access providers 114 may also serve as content publishers 102 and hosting providers 104 for audience 108 websites. Multi-service access providers are accounted for in embodiments of the invention, wherein their multiple value-added services are recognized and compensated for respectively. A distribution network owner 116 can generally be described as an entity that replicates, or caches, content at locations distributed across the Internet for delivery to audience members, with the goal of providing the content to the audience quicker and more efficiently.

Since hosting providers provide part of the content delivery infrastructure, that is, they at least deploy equipment to deliver content, according to one embodiment, they are also potential participants in the cooperative organization in addition to being beneficiaries of the infrastructure and services provided by the cooperative. Incentive for hosting providers to join the cooperative include compensation for the delivery services that they provide. Otherwise, hosting providers may be required to be party to selling agent agreements with the cooperative in order to receive compensation.

Delivery of services within the cooperative does not require direct relationships between provisioning members (e.g., hosting and access providers), between provisioning members and the content audience, or between the cooperative and the content audience.

Cooperative Services

Embodiments of the invention provide techniques for supporting services offered by the cooperative members, as described below, which in combination provide the capability of offering multi-network content distribution services to their customers. Customers may include but are not limited to content publishers and their hosting providers.

Service Development and Marketing

The service offerings and the indirect sales model define the cooperative to the target markets. Therefore, in one embodiment, the cooperative defines the shared content-distribution services offered by the members of the cooperative. Although the indirect sales model may appear to insulate the cooperative's customers from the services of the cooperative, product and service definition is important to the existence of the cooperative. In general, embodiments include systems and processes necessary to support multi-network products and services offered by the cooperative.

In one embodiment, the cooperative centralizes the basic marketing functions for the products and services offered by the cooperative. Consistency of marketing within the cooperative, that is, among all of its members, is important to the success of the cooperative. Therefore, the cooperative defines the goals of any marketing campaign, and generally defines the associated messages and the parameters related thereto.

Interoperability Standards

In one embodiment, the cooperative defines minimum interoperability standards for the systems and processes that underpin the cooperative's commercial offerings. Centralized standards for cooperative members include, but are not limited to, the following:

Protocols for specification and transfer of information related to monitoring, management, and administration of the network service distribution infrastructure and for specification and transfer of control signals;

Protocols for specification and transfer of network service distribution system data and service utilization data; and Processes for customer and cooperative member account management (for example, financial settlement, such as financial resource management, allocation, and distribution, and revenue distribution and sharing).

The protocols and process standards are defined by the cooperative at all levels of the content distribution cooperative and customer-provider relationships. Reliability and consistency of the offered services is thus ensured.

Infrastructure Monitoring Management and Administration

In addition to specifying interoperability standards as described above, in one embodiment, the cooperative acts as an independent monitoring, management, and administrative agent of the network infrastructure on which the content distribution services are provided. In this role, the cooperative polices the performance of the individual members that provide services to the cooperative's customers. In one embodiment, cooperative policy ties revenue settlement to member performance within the scope of service level agreements that are part of the cooperative's membership contract. For example, the amount of revenue a cooperative member may receive is based on the level of contribution of a member to the overall content distribution services, as well as the quality of such contribution.

The cooperative's monitoring-related services include monitoring member network system and service availability, as well as performance. Management services include deployment and ongoing oversight of network and server capacity and performance. Administration services include the activation and oversight of customer services and related responses.

Utilization Data Collection

One basis of the cooperative's revenue and revenue sharing models is network utilization data related to content requests. In one embodiment, this data is obtained from distributed servers. This data includes both detailed activity records for each audience interaction and summary records for customers and cooperative members. Although the cooperative may offer service models that are not directly tied to customer utilization, utilization data is core to the defined value of the distributed services offered by the cooperative. Furthermore, content access and utilization data is highly valuable to the customer base.

Billing policies and rating standards

In one embodiment, the cooperative provides standards of economic interaction. Specifically, the cooperative specifies aspects, or protocols, of the financial interaction between members. The content publishers are a primary source of revenue for the cooperative. With the cooperative, the relationships between the content publishers and their access or hosting providers remain intact. Given this framework, in one embodiment, the cooperative sets the wholesale and recommended retail prices or rates for its services. Note that individual cooperative members may choose to offer the cooperative's services for more or less than the recommended retail prices. A member may even choose to sell at below the wholesale cost of the service. The prices charged by cooperative members are a factor in the revenue distribution model under which the cooperative operates. Furthermore, in addition to setting billing rates and policies, the cooperative is responsible for developing, deploying, and maintaining the algorithms and systems to implement billing.

Bill generation and presentation

As discussed, the relationship between the content publishers and their access or hosting providers remains in tact. Thus, although the cooperative collects the billing information, applies the policies and rates, and generates the billing records, the access or hosting provider is responsible for bill presentment and collection, according to one embodiment.

In addition, the access and hosting providers are responsible for forwarding the appropriate revenue share to the cooperative.

Revenue settlement among members

Once the revenue from a customer arrives at the cooperative, the revenue distribution or settlement process, as defined by the cooperative, determines the allocation of revenues to the members who provisioned the underlying services.

Control Flow Model

Figure 2:
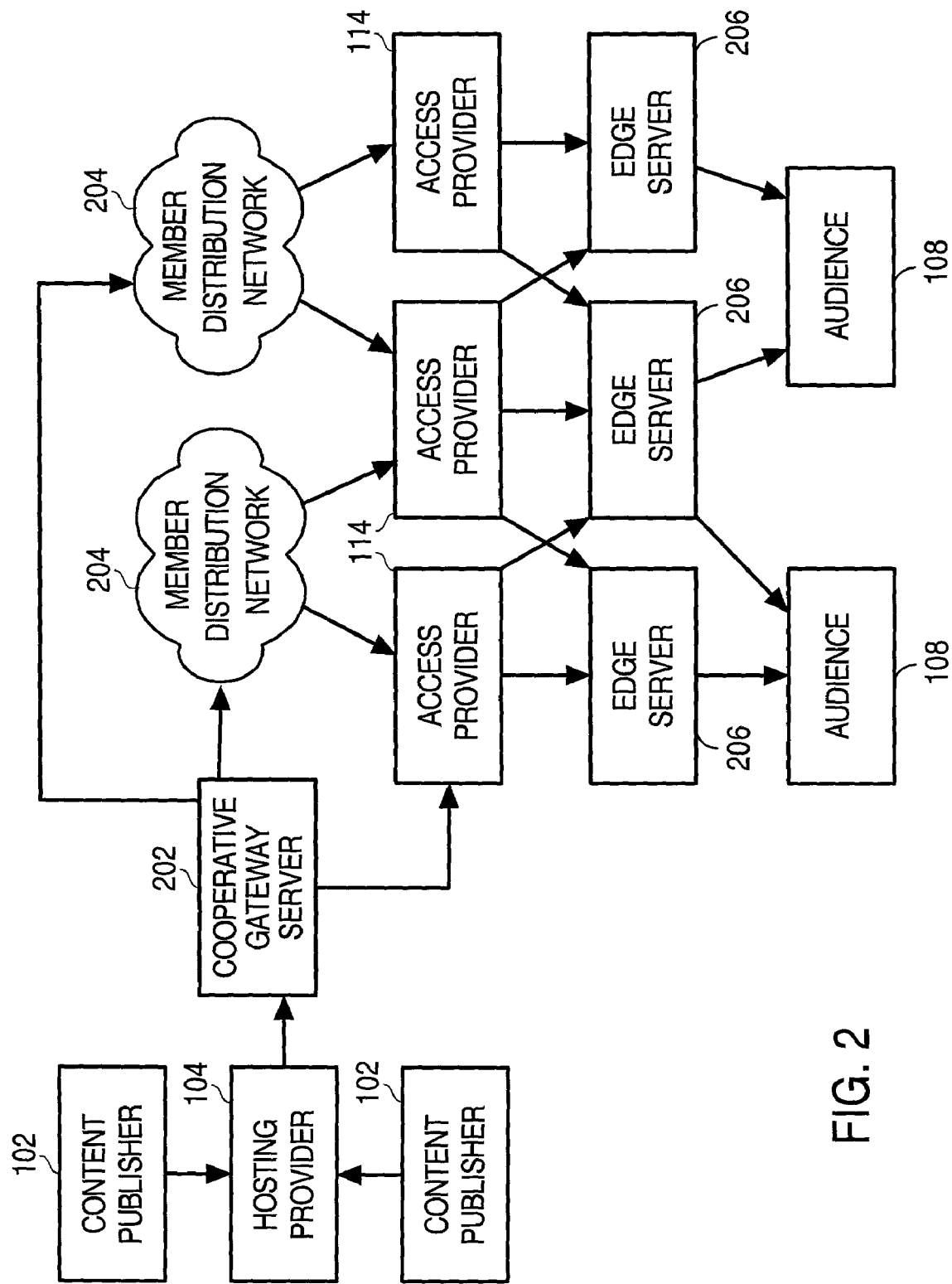
FIG. 2 is a block diagram illustrating the interaction among various Internet service providers cooperating to provide improved distributed network services, including content distribution, according to embodiments of the invention.

FIG. 2 is a block diagram illustrating the interaction among various Internet service providers cooperating to provide improved distributed network services, including content distribution, according to embodiments of the invention. The number of entities depicted is for illustrative purposes only, for any number of entities can participate in the methods described herein. According to one embodiment, one or more content publishers 102 transmit a control signal to their respective hosting provider 104. A control signal can take any form, such as an HTML or XML document, and can utilize any communication protocol compatible with the Internet, such as TCP/IP. The content of the control signal is for providing or revising content that is distributed around the Internet in various caches.

Hosting provider 104 aggregates control signals from its content publisher 102 subscribers. In one embodiment, the hosting provider 104 operates a gateway server to at least receive, process, and transmit the control signals from the content publishers 102. The hosting provider 104 periodically forwards the control signals to a cooperative gateway server 202, which is operated by the cooperative 106 (FIG. 1). The cooperative gateway server 202 receives the control signals from the hosting providers 104, and provides administrative services thereto. For example, the cooperative gateway server 202 authenticates, authorizes, and verifies the signals prior to transmission on through the Internet. In such a scenario, the hosting provider 104 has incentive to be a participating member of the cooperative organization to benefit from the revenue generated by the cooperative, rather than being an outside agent of the cooperative.

The cooperative gateway server 202 forwards the control signals to control gateways within member distribution networks 204. Distribution networks 204 are operated by distribution network owners 116 (FIG. 1) to cache content at a plurality of locations distributed on their networks, or the Internet as a whole, with the goal of efficient and fast content delivery to audience 108. Hence, distribution network owners 116 distribute the control signals to their distributed server infrastructure, as necessary. That is, the control signals are forwarded to the plurality of locations of cached content in order to affect the content cached thereon. The cooperative gateway server 202 and the control gateways within member distribution networks 204 also forward the control signals to control gateways at network access providers 114, which forward the control signals on to edge servers 206. Edge servers 206 are servers located at the edge, or outer boundary, of an IP network, where it is closer to other IP networks. Consequently, content served from an edge server 206 is considered closer to the audience 108, and thus quicker to deliver in response to an audience 108 request.

Through the transmission of control signals by cooperative members, as described above, the content publishers 102 control their content that is cached at numerous locations across the Internet. Hence, a content publisher 102 can orchestrate revisions to their cached content through a single interaction with the centralized cooperative gateway server 202, in contrast to interacting directly with each of the numerous cache locations. As such, even dynamic content that changes frequently can be cached and subsequently dynamically refreshed. For example, if the content publisher is an auction site, the web page corresponding to a listed item can be updated at all cache sites as soon as a new bid is received, without the need for the auction site to interact directly with the many different caches that store the web page.

In another embodiment, the control signals are forwarded by the hosting providers 104 to a trusted third party, instead of the cooperative gateway server 202. The trusted third party forwards the aggregated control signals to cooperative member distribution networks 204 after authentication, authorization, and verification. Subsequently, the cooperative 106 members transmit the control signals as described above, in order to send them to the appropriate content cache servers.

Figure 3:
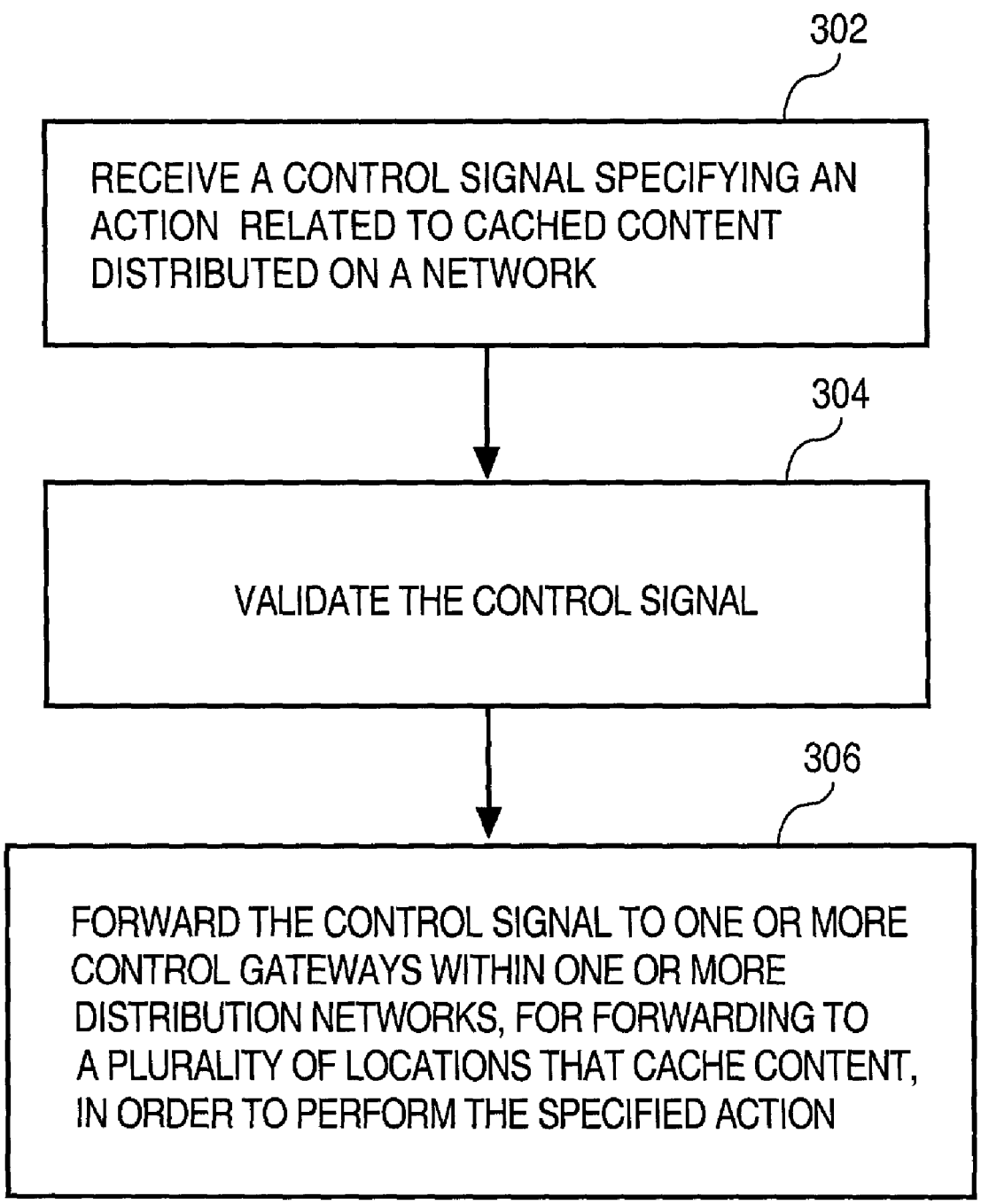
FIG. 3 is a flow diagram illustrating a method for managing content caches distributed on a network, according to an embodiment of the invention.

FIG. 3 is a flow diagram illustrating a method for managing content caches distributed on a network, according to an embodiment of the invention. At step 302, a control signal specifying an action related to cached content distributed on a network is received. For example, a content publisher 102 sends an HTML file representing an updated web page. At step 304, the control signal is validated. For example, it is verified that the HTML file that was received is from the content publisher. At step 306, the control signal is forwarded to one or more control gateways within one or more content distribution networks, for forwarding to a plurality of locations that cache content in order to perform the specified action related to the cached content. In one embodiment, the method described can be performed by the cooperative gateway server 202, under the control of the cooperative 106 or cooperative members. In another embodiment, the steps can be carried out by a trusted third party.

Utilization Data Model

Figure 4:
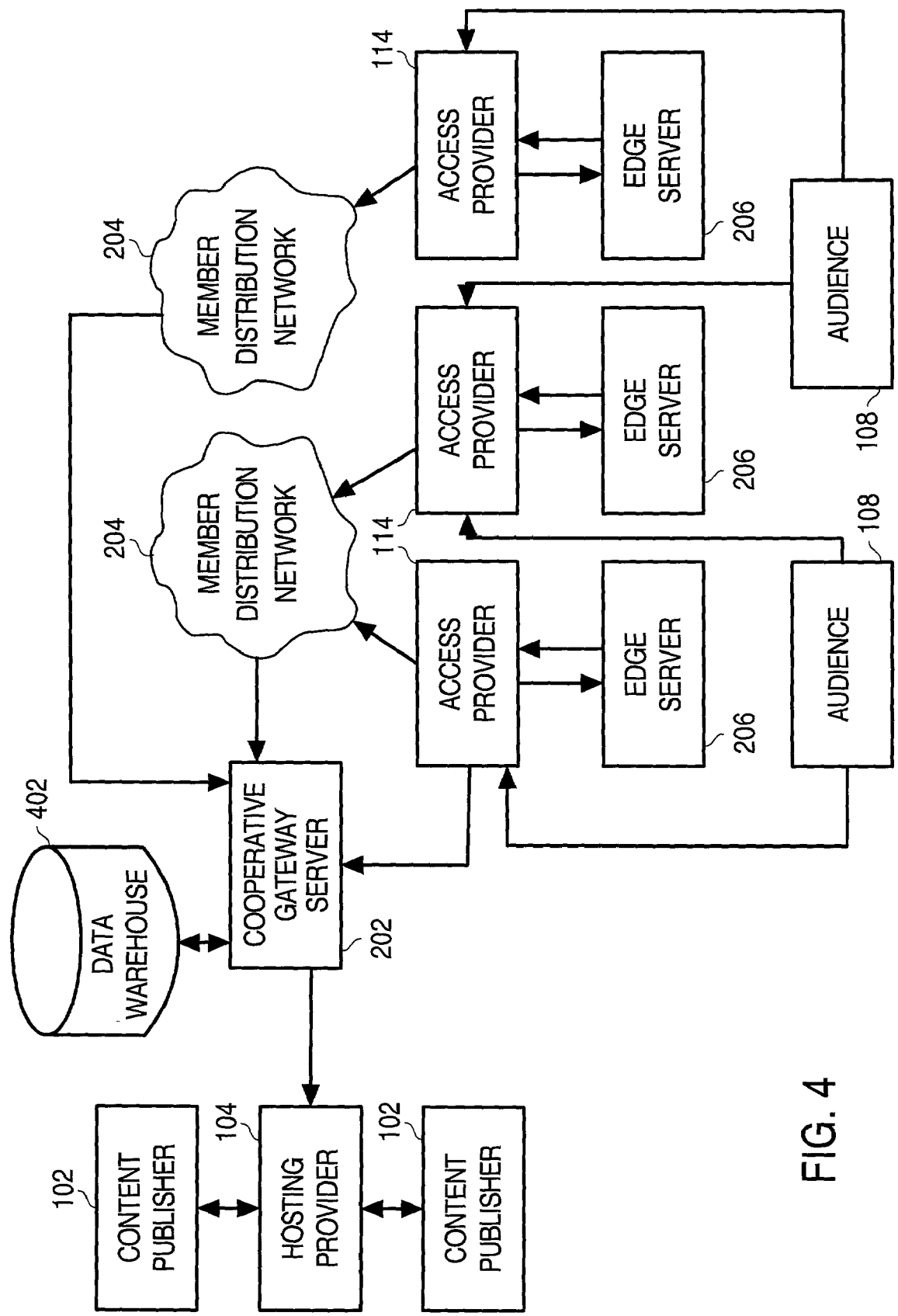
FIG. 4 is a block diagram illustrating the interaction among various Internet service providers cooperating to provide improved distributed network services, including content distribution, according to embodiments of the invention.

FIG. 4 is a block diagram illustrating the interaction among various Internet service providers cooperating to provide improved distributed network services, including content distribution, according to embodiments of the invention. The number of entities depicted is for illustrative purposes only, for any number of entities can participate in the methods described herein. According to one embodiment, audience 108 members, connected to the Internet through bandwidth provided by one or more access providers 114, request content from a content publisher 102. Each content access request triggers the creation of an activity record at an edge server 206. The activity record can take any form, such as an XML document, and can utilize any communication protocol compatible with the Internet, such as TCP/IP. The activity records are for recording the requests for access to content that is distributed around the Internet in various caches. Periodically, edge servers 206 forward their activity records, typically aggregated, to gateways at access provider 114 networks.

Access providers 114 aggregate the activity records from several edge servers 206, either on the same network or on multiple networks, prior to forwarding them to gateways within the member distribution networks 204. From there, distributed servers from member distribution networks 204 forward the activity records to the cooperative gateway server 202. In one embodiment, gateways at access provider networks 114 can also directly forward activity records to the cooperative gateway server 202.

The cooperative gateway server 202 further aggregates and collates the activity records that it receives, and stores them in a data warehouse 402 or similar storage facility or mechanism. The cooperative gateway server 202 periodically generates customer-specific (i.e., specific to particular content publishers 102) activity record logs or summaries that are forwarded to the hosting provider 104. The hosting provider 104 stores the activity data for subsequent retrieval by a content publisher 102. In one embodiment, the hosting provider 104 maintains a logging gateway for receiving, processing, and serving the activity logs. In this scenario, the hosting provider 104 can benefit by being a participating member of the cooperative organization, in order to be compensated for the services they provide to associated content providers.

Content publishers 102, at their discretion, can retrieve the activity record logs associated with their content. Through the transmission of activity records by the cooperative 106 to content publishers 102, as described above, the content publishers 102 can monitor the overall number of accesses to their content regardless of the content cache location. This is an advantage over current methods, whereby audience requests for and access to cached content is typically transparent to content publishers 102 because, prior to this invention, content publishers 102 generally record only content requests that actually are received by their server or an associated hosting provider 104 server. Furthermore, content publishers 102 can extract demographic and geographic information from the activity records since individual caches are frequently associated with access providers 114 serving a particular geographic locale.

In one embodiment, the activity records are generated at distribution network 204 and other member servers in response to audience 108 requests, and periodically forwarded to a trusted third party instead of the cooperative gateway server 202. The trusted third party aggregates and collates the activity records prior to forwarding through member distribution networks 204 to the respective content publishers 102.

The activity record model described streamlines the overall process of interaction between content publishers 102 and access providers 114 in relation to the current interaction process, where content publishers 102 must interact with many access providers 114. The present teachings allow for a content publisher 102 to interact with a central entity, i.e., cooperative gateway server 202 or a trusted third party, rather than a large, unmanageable number of access providers 114.

Figure 5:
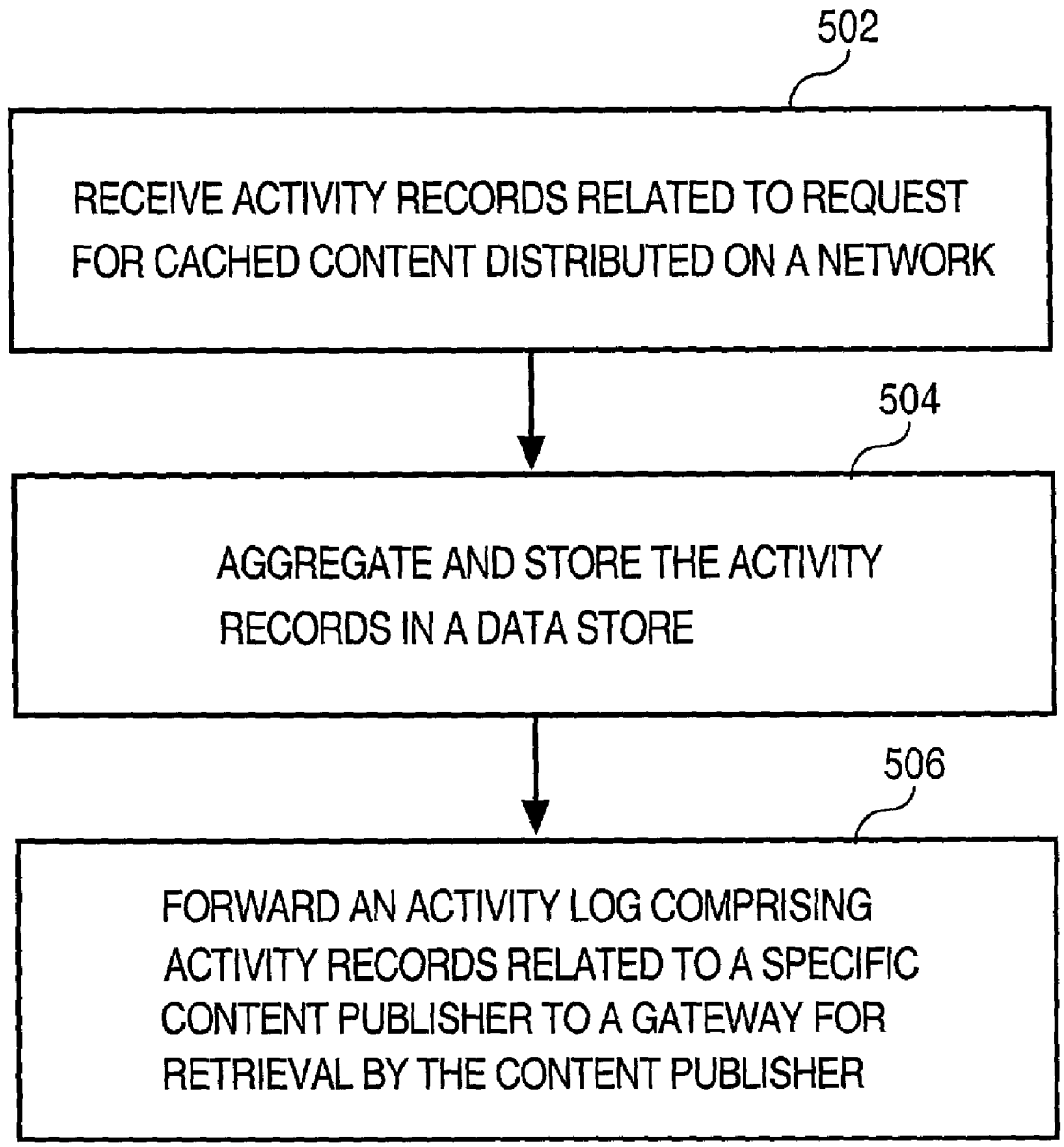
FIG. 5 is a flow diagram illustrating a method for managing content caches distributed on a network, according to an embodiment of the invention.

FIG. 5 is a flow diagram illustrating a method for managing content caches distributed on a network, according to an embodiment of the invention. At step 502, activity records related to requests for cached content distributed on a network are received. At step 504, the activity records are aggregated and stored in a data store, such as data warehouse 402. At step 506, an activity log comprising activity records related to a specific content publisher, such as content publisher 102, is forwarded to a gateway for retrieval by the specific content publisher. Thus, content publishers can monitor requests for their content that is cached throughout a network, such as the Internet. In one embodiment, the method described can be performed by the cooperative gateway server 202, under the control of the cooperative 106 or cooperative members. In another embodiment, the steps can be carried out by a trusted third party.

Business Model

Content publishers 102 are considered the primary source of revenue for the cooperative. Historically, content publishers 102 pay their hosting providers 104 for their network bandwidth and site hosting services. In embodiments of the present invention, the content distribution models described herein still rely on revenue infusion from the content publishers 102.

In one embodiment, after receiving payment from content publishers 102 (FIG. 1) for the network infrastructure and services provided, hosting providers 104 (FIG. 1) retain a portion of the payment received for the distributed services that they provide and forward the remainder to the cooperative. Cooperative members, such as network owners 110, carriers 122, access providers 114, and distribution network owners 116, each receive a portion of the cooperative revenue based on their contribution to the overall content delivery service. In an alternate embodiment, the payment is forwarded to a trusted third party for settlement among the cooperative members. In another embodiment, the quality of the services provided is also a factor in distributing the revenue, similar to traditional service level agreements. In yet another embodiment, the cooperative, as an organization, retains a portion of the revenue for the services which were rendered. For example, maintaining the cooperative gateway server 202 (FIG. 2) is considered a value-added service deserving of a revenue share. In yet another embodiment, cooperative advertising activities are considered a service deserving of a revenue share. According to one embodiment of the cooperative business model, the audience 108 continues to contribute revenue to the access providers 114 for access to the Internet, which is factored into the overall revenue sharing model of the cooperative.

In summary, methods and systems for cooperative management of distributed network caches have been described.

Hardware Overview

Figure 6:
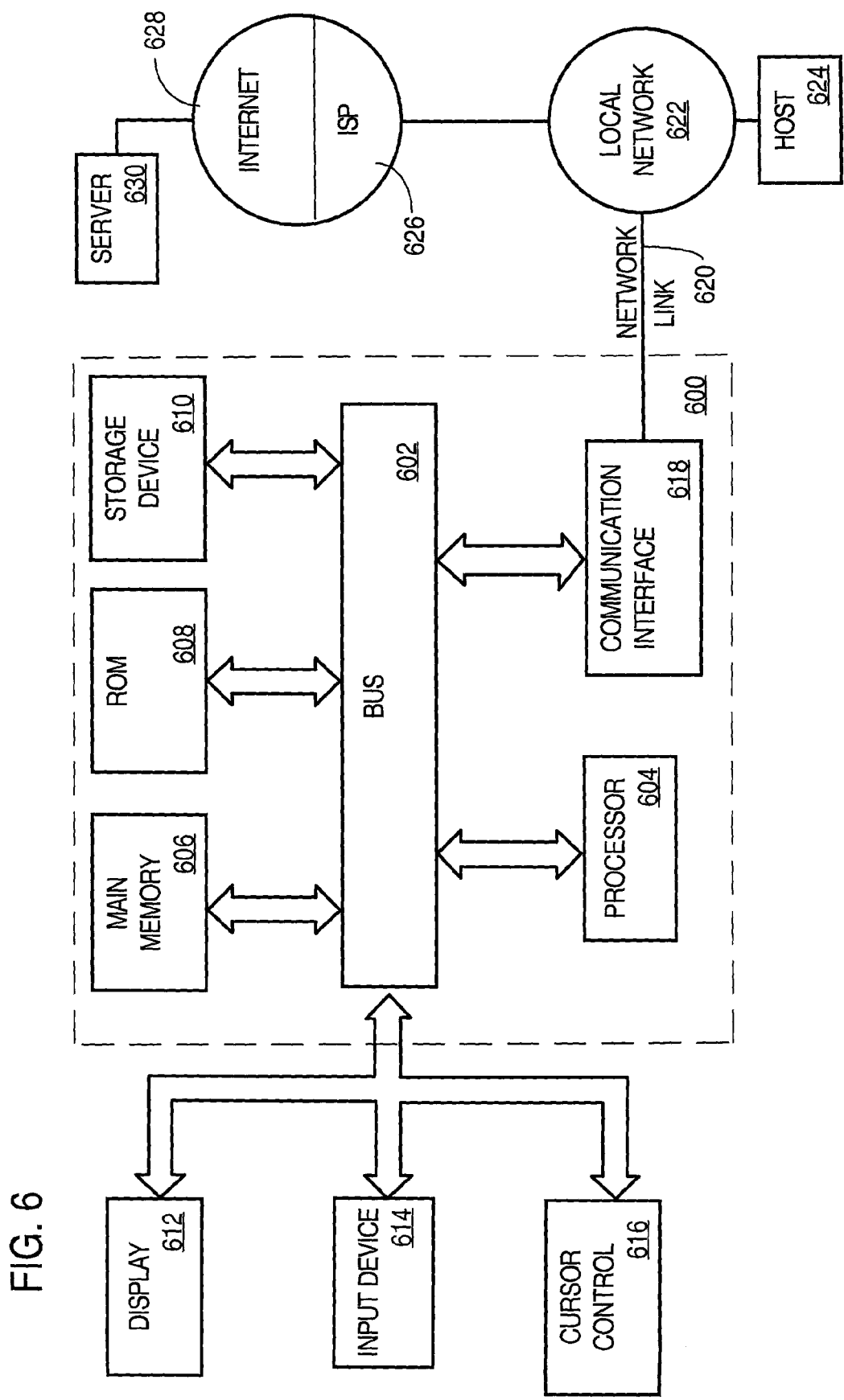
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, or magneto-optical disk, is provided and coupled to bus 602 for storing information and instructions.

Computer system 600 may be coupled via bus 602 to a display 612, such as a cathode ray tube (CRT) or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer systems 600 for implementing the techniques described herein. According to one embodiment of the invention, those techniques are performed by computer systems 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical, magnetic, or magneto-optical disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, many of the embodiments discussed herein use the Internet as the underlying network through which services are provided. However, the techniques described herein are not limited to any particular network system. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing content caches distributed on a network, comprising the steps of:

in response to a first request, via a first network access provider, for particular content wherein the particular content is served from a first server cache at a first location on the network, creating at the first server a first activity record corresponding to the first request;

in response to a second request, via a second network access provider, for the particular content wherein the particular content is served from a second server cache at a second location on the network that is a different location from the first location, creating at the second server a second activity record corresponding to the second request;

receiving from the first server, at a gateway to the first network access provider network, a first set of activity records that contain statistics about requests for content that resides in caches at a plurality of locations wherein the first set of activity records includes the first activity record;

receiving from the second server, at a gateway to the second network access provider network, a second set of activity records that contain statistics about requests for content that resides in caches at a plurality of locations, wherein the second set of activity records includes the second activity record;

forwarding the set of activity records to a cooperative gateway server managed by a cooperative of network service providers, wherein the cooperative of network service providers comprises (a) the first and second access providers, (b) distribution network owners associated with the first and second servers, and (c) content hosting providers associated with content publishers;

the cooperative gateway server collating the set of activity records based on which content publisher provided the content associated with each respective activity record;

forwarding collated activity records to respective content hosting providers associated with respective content publishers; and providing, to each of a plurality of content publishers whose content is distributed in various caches on the network, statistics based on activity records and the corresponding requests for content provided by the content publisher so that the plurality of content publishers can monitor the overall number of accesses to their respective content regardless of the content cache location.

2. The method of claim 1 further comprising, prior to the step of providing statistics to each content publisher, the step of:

creating an activity log comprising statistics corresponding only to content provided by a specific content publisher of the plurality of content publishers.

3. The method of claim 1 further comprising the step of:

aggregating, at the gateway to the first network access provider network, activity records from a plurality of edge servers.

4. The method of claim 1 wherein the step of receiving the first set of activity records comprises receiving activity records originating at one or more edge servers.

5. The method of claim 1 wherein the first set of activity records includes activity records that are related to requests for content provided by two or more content publishers, the method further comprising the step of:

forwarding the first set of activity records to a trusted third party wherein the third party aggregates the activity records included in the first set based on which content publisher provided the content associated with each of the activity records; and wherein the step of providing statistics is performed by the third party by transmitting statistics associated with content provided by a first content publisher to a gateway at one or more hosting providers associated with the first content publisher.

6. The method of claim 1 wherein at least one member of the cooperative is from a group consisting of a network owner, and a telecommunications carrier.

7. The method of claim 1, further comprising the steps of:

receiving, by a trusted third party, revenue for network services provided by members of the cooperative; and distributing the revenue to members of the cooperative based on member contribution to the network services provided.

8. The method of claim 7 wherein the step of distributing the revenue to members of the cooperative is based on the quality of performance of the member contribution to the network services provided.

9. The method of claim 1, further comprising the steps of:

receiving, by the cooperative, revenue for network services provided by members of the cooperative;

distributing the revenue to members of the cooperative based on member contribution to the network services provided.

10. The method of claim 9 wherein the step of distributing the revenue to members of the cooperative is based on the quality of performance of the member contribution to the network services provided.

11. The method of claim 1 wherein the step of providing statistics to content publishers includes providing, in response to a request from a particular content publisher, a particular activity log that corresponds to the particular content publisher.

12. The method of claim 1, comprising:

extracting from the activity records demographic information about those who request the content.

13. The method of claim 1, comprising:

extracting from the activity records geographic information about those who request the content.

14. Computer-readable media bearing one or more sequences of instructions for monitoring requests for content cached distributively on a network, wherein execution of the one or more sequences of instructions by one or more processors causes the one or more processors to perform the steps of:

in response to a first request, via a first network access provider, for particular content wherein the particular content is served from a first server cache at a first location on the network, creating at the first server a first activity record corresponding to the first request;

in response to a second request, via a second network access provider, for the particular content wherein the particular content is served from a second server cache at a second location on the network that is a different location from the first location, creating at the second server a second activity record corresponding to the second request;

receiving from the first server, at a gateway to the first network access provider network, a first set of activity records that contain statistics about requests for content that resides in caches at a plurality of locations, wherein the first set of activity records includes the first activity record;

receiving from the second server, at a gateway to the second network access provider network, a second set of activity records that contain statistics about requests for content that resides in caches at a plurality of locations, wherein the second set of activity records includes the second activity record;

forwarding the set of activity records to a cooperative gateway server managed by a cooperative of network service providers, wherein the cooperative of network service providers comprises (a) the first and second access providers, (b) distribution network owners associated with the first and second servers, and (c) content hosting providers associated with content publishers;

the cooperative gateway server collating the set of activity records based on which content publisher provided the content associated with each respective activity record;

forwarding collated activity records to respective content hosting providers associated with respective content publishers; and providing, to each of a plurality of content publishers whose content is distributed in various caches on the network, statistics based on activity records and the corresponding requests for provided by the content publisher so that the plurality of content publishers can monitor the overall number of accesses to their respective content regardless of the content cache location.

15. The computer-readable media of claim 14 wherein execution of the one or more sequences of instructions by one or more processors causes the one or more processors to perform, prior to the step of providing statistics to each content publisher, the step of:

creating an activity log comprising statistics corresponding only to content provided by a specific content publisher of the plurality of content publishers.

16. A method for improving communication among a plurality of parties providing distribution services, over a network, for content that is cached at a plurality of locations, comprising:

a cooperative organization allowing a content publisher to monitor access to content provided by the content publisher, wherein the content resides in distributed caches not controlled by the content publisher, by providing, via a cooperative gateway server managed by the cooperative organization, to each content publisher of a plurality of content publishers, respective activity records having information about each respective request for access to the cached content provided by that content publisher, wherein the information is collected and aggregated at the cooperative gateway server according to which content publisher provided the content associated with the information;

wherein the information is received at respective gateways to respective network access provider networks:

wherein the information is received at said respective gateways from corresponding servers that serve the content from different locations on the network: and wherein members of the cooperative organization include (a) a telecommunications carrier, (b) a distribution network owner that caches content at locations distributed across the network for serving to requestors, and (c) a hosting provider that hosts content for one or more of the plurality of content publishers.

* * * * *

UNITED STATES PATENT AND TRADEMARK OFFICE
CERTIFICATE OF CORRECTION

| | | |
|---|---|---|
| PATENT NO. | : 7,117,262 B2 | Page 1 of 1 |
| APPLICATION NO. | : 10/017997 | |
| DATED | : October 3, 2006 | |
| INVENTOR(S) | : Joseph J. Bai et al. | |

It is certified that error appears in the above-identified patent and that said Letters Patent is hereby corrected as shown below:

On Title Page item 75
(75) Inventors:
    Please delete "Paul Cheng, Cambridge, MA (US);" and insert --Paul Cheng, Budapest, Hungary;--.

COLUMN 14
Claim 6: Line 3: Please delete "owner, and" and insert --owner and--

Claim 14: Line 56: Please delete "locations, wherein" and insert --locations wherein--.

COLUMN 15
Claim 14: Line 14: Please delete "for provided" and insert --for content provided--.

Claim 15: Line 18: Please delete "claim 14 wherein" and insert --claim 14, wherein--.

COLUMN 16
Claim 16: Line 17: Please delete "works:" and insert --works;--.
        Line 20: Please delete "network: and" and insert --network; and--.

Signed and Sealed this

Nineteenth Day of December, 2006

JON W. DUDAS
*Director of the United States Patent and Trademark Office*